(No Model.)
A. TREXLER.
COMBINED PLOW AND HARROW.
No. 389,675. Patented Sept. 18, 1888.
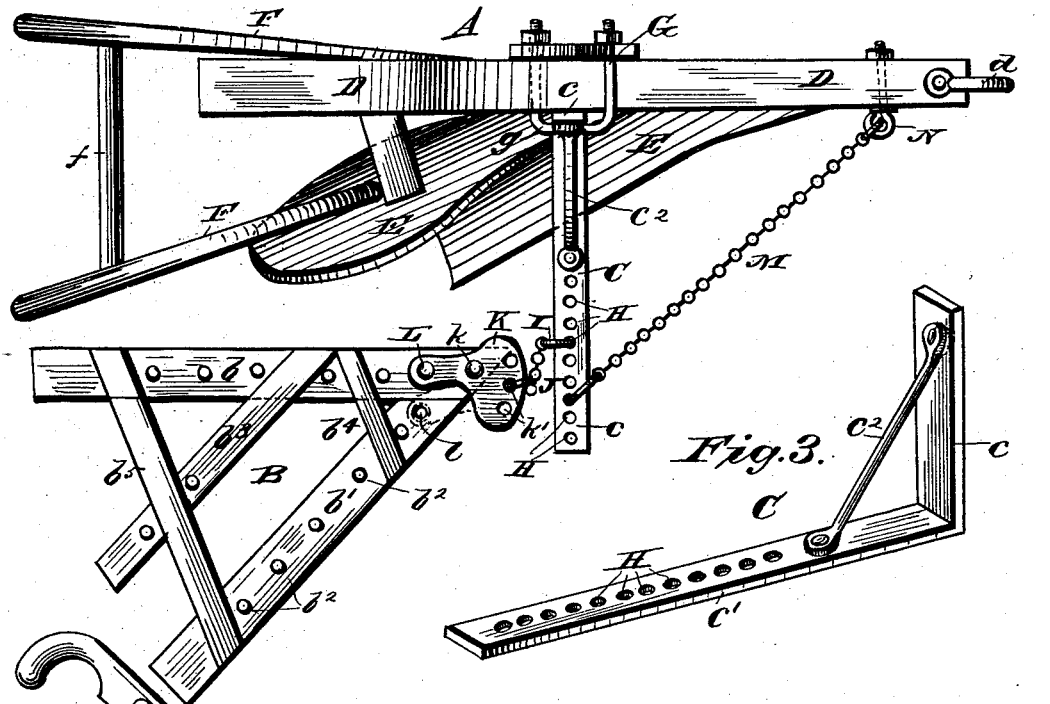
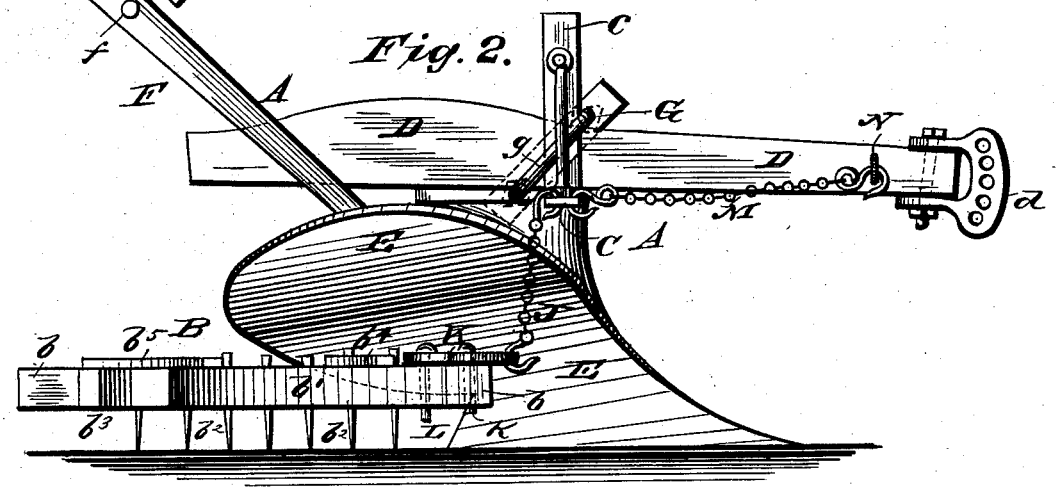
WITNESSES:
INVENTOR:
BY
ATTORNEYS.

UNITED STATES PATENT OFFICE.

ANNA TREXLER, OF SABIN, MINNESOTA.

COMBINED PLOW AND HARROW.

SPECIFICATION forming part of Letters Patent No. 389,675, dated September 18, 1888.

Application filed October 10, 1887. Serial No. 251,923. (No model.)

*To all whom it may concern:*

Be it known that I, ANNA TREXLER, of Sabin, in the county of Clay and State of Minnesota, have invented a new and Improved Combined Plow and Harrow, of which the following is a full, clear, and exact description.

My invention relates to a combined plow and harrow, and has for its object to provide a simple inexpensive harrow attachment adapted for connection to a plow-beam to be drawn therefrom, and operating to pulverize the earth freshly turned over by the plow, to prepare the soil to receive seed, and accomplish the work with economy of time and labor.

The invention consists in certain novel features of construction of the combined plow and harrow, and of the harrow attachment particularly, all as hereinafter described and claimed.

Reference is to be had to the accompanying drawings, forming a part of this specification, in which similar letters of reference indicate corresponding parts in all the figures.

Figure 1 is a plan view of my improved plow and harrow. Fig. 2 is a side elevation thereof, and Fig. 3 is a perspective view of the draft-bar which connects the harrow to the plow-beam.

The plow A may have any approved construction, and is connected to the harrow B by a draft-bar, C, as hereinafter fully explained.

The plow-beam D carries the mold-board E, and two handles, F F, are fixed at their lower ends, one to the plow mold-board and the other to its landside, and project upward and rearward, and are connected by a round or tie bar, $f$. The draft-bar C is a bar of metal made in angular form, or with a short vertical part, $c$, and a longer horizontal arm, $c'$, which are preferably stayed to each other by a brace-bar, $c^2$. An ordinary clevis, G, clamps the part $c$ of the draft-bar, by its cross-piece $g$, to the plow-beam about over the center of the plow mold-board, and so as to allow vertical adjustment of the draft-bar on the plow-beam.

The draft-bar C is provided with a series of holes, H, into any one of which a ring or link, I, may be connected, and to this ring or link is attached a short chain, J, which is connected by a ring or link with a draft-clevis, K, held to the forward end of the harrow by a pin, $k$, on which the clevis may be turned horizontally, to allow a pin, L, to be passed through the back end of the clevis into a hole in the beam $b$ of the harrow, as shown in full lines in Fig. 1 of the drawings, or to allow said pin L to be set in a hole, $l$, made in the other beam, $b'$, of the harrow. The forward end of the clevis K is provided with a series of holes, $k'$, into any one of which the ring attached to the chain J, or one of the chain-links, may be coupled. With this construction the harrow may be connected to the draft-bar C nearer to or farther from the plow-beam, and by turning the clevis K and adjusting the pin L in either of the two holes in the harrow-beams $b\ b'$ the line of draft or position of the moving harrow may be regulated at will, to cause the harrow-teeth $b^2$ to work most effectively in crushing and pulverizing the earth thrown over in front of it by the plow mold-board.

The outer end of the draft-bar C is connected by a chain, M, with the forward part of the plow-beam, and when the beam is a wooden one the chain will be connected to it by an eye-bolt, N, passed through a metal plate fixed to the side of the beam and held by a nut, as shown in the drawings; but when the plow-beam is made of metal a small clevis will be substituted for the eyebolt to hold the draft-chain M. The plow-beam has the usual clevis, $d$, allowing the draft-connection to be set higher or lower for working the mold-board at different depths in the soil.

The harrow B has a general > form, and comprises the two toothed beams $b\ b'$, above mentioned, and a toothed beam, $b^3$. The beams $b\ b'$ are connected to each other at the nose or point of the harrow, and are also connected by cross-bars $b^4\ b^5$, and the beam $b^3$ is connected to the beam $b'$ and the rear cross-bar, $b^5$, all as shown most clearly in Fig. 1 of the drawings.

It is obvious that by raising the draft-bar C on the plow-beam the nose of the harrow will also be raised correspondingly, and this feature, in connection with the adjustment of the harrow nearer to or farther from the plow mold-board and the adjustments of the harrow-clevis on the frame and of the draft-chain J in the clevis, allows the harrow to be set high or low or to take any preferred line of draft over the earth freshly turned over by the plow mold-board. The draft of the combined implement is light and there is little or no side draft, and economy of time and labor is effected by harrowing while the plowing progresses, and when the ground is once gone over it is ready to receive seed.

Metal rods may be used instead of the chains J M; but the chains are at present preferred.

Having thus described my invention, what I claim as new, and desire to secure by Letters Patent, is—

1. A harrow-connecting attachment for plows, comprising the L-shape draft-bar C, the horizontal arm $c'$ of which has apertures or eyes H, and the U-shape clip $g$, embracing the short vertical arm $c$ of the bar C and adapted to embrace a plow-beam, substantially as set forth.

2. A harrow-connecting attachment for plows, consisting in the L-shape draft-bar C, having a series of apertures, H, in its longer horizontal arm, $c'$, a brace-bar, $c^2$, connecting said arm $c'$ with the shorter vertical arm, $c$, and the U-shape clip $g$, embracing the arm $c$ under the cross-bar and adapted to clamp it to a plow-beam, substantially as set forth.

ANNA TREXLER.

Witnesses:
L. A. LEIGHTON,
W. H. LEIGHTON.